United States Patent [19]

Loutaty et al.

[11] Patent Number: 4,564,328
[45] Date of Patent: Jan. 14, 1986

[54] APPARATUSES FOR THE LOADING OF AN ENCLOSURE WITH A PARTICULATE SOLID

[75] Inventors: Roben Loutaty, Le Havre; Yvon Haquet, St Romain de Colbosc, both of France

[73] Assignee: Compagnie Francaise de Raffinage, Paris, France

[21] Appl. No.: 566,570

[22] Filed: Dec. 29, 1983

[30] Foreign Application Priority Data

Dec. 30, 1982 [FR] France .............................. 82 22064

[51] Int. Cl.[4] ............................................. B65G 65/32
[52] U.S. Cl. .................................... 414/301; 239/654; 239/682; 414/786
[58] Field of Search ............... 414/160, 205, 206, 299, 414/300, 301, 786; 239/654, 682, 684; 406/29, 193

[56] References Cited

U.S. PATENT DOCUMENTS

| | | | |
|---|---|---|---|
| 2,739,522 | 3/1956 | Graham, Jr. ..................... 414/301 X |
| 3,361,258 | 1/1968 | Kalke ................................ 414/301 X |
| 3,490,619 | 1/1970 | Wittie ................................ 414/301 |
| 3,620,390 | 11/1971 | McKinnon ........................ 414/301 |
| 3,854,637 | 12/1974 | Muller, Jr. et al. ............ 414/299 X |
| 3,972,567 | 8/1976 | Uhl ................................... 239/654 X |
| 4,306,829 | 12/1981 | Loutaty et al. .................. 414/301 |
| 4,437,613 | 3/1984 | Olson ............................... 414/301 X |

*Primary Examiner*—Joseph E. Valenza
*Assistant Examiner*—Ken Muncy
*Attorney, Agent, or Firm*—Curtis, Morris & Safford

[57] ABSTRACT

Apparatus for loading an enclosure with particulate solids includes a loading hopper, a discharge chute (integral with the hopper), and a movable member disposed below the outlet opening of the chute. The movable member includes a shaft driven in rotation by a motor and flexible, moderately hard deflecting strips, which are articulated to the shaft or to a structure rigidly integral with the shaft, so as to spread out from the shaft at an angle by the effect of centrifugal force when driven in rotation. At least one discharge opening is provided in the side wall of the hopper and/or of the chute in the direction of the rotating deflecting strips.

20 Claims, 4 Drawing Figures

APPARATUSES FOR THE LOADING OF AN ENCLOSURE WITH A PARTICULATE SOLID

FIELD OF THE INVENTION

The present invention relates to apparatuses for the loading of an enclosure with a particulate solid. It relates in particular to the loading of a storage silo with grain or of a chemical reactor with a catalyst in the form of particles of any shape.

DESCRIPTION OF THE PRIOR ART

It is known that the maximum loading density, that is to say, the maximum ratio between the weight of the divided solid loaded and the available volume of the enclosure, is obtained when the solid particles drop vertically into the enclosure to be filled, and uniformly over its entire cross-sectional area, in the manner of a rain, with the level of the solid then rising evenly in the enclosure, without preferential accumulations at some points.

However, the loading of a chemical reactor with a granular catalyst, or of a silo with grain, is conventionally carried out through a loading hopper disposed in a manhole which usually is provided at the top of the enclosure, and it is then very difficult to secure a rainlike fall of the particles, especially when the manhole or loading opening is offset from the axis of the enclosure, as is often the case.

If loading is carried out without the use of an auxiliary leveling device for the solid which is distributed below the outlet opening of the loading hopper, the particles will not fill the enclosure in the form of a uniform and level bed but will form a more or less pointed dome, depending on the nature and shape of the particles.

To overcome this drawback, many apparatuses have been proposed in the past which use distributing elements disposed below the lower opening of the loading hopper, these elements being either revolving elements (U.S. Pat. No. 3,804,273) or static elements on which the grains coming from the hopper fall and toward which air is sometimes blown sideways to scatter the grains (U.S. Pat. No. 4,051,019).

such apparatuses do not always permit the solid particles to be distributed evenly, as a uniform rain, over the entire surface of the bed. Most of these apparatuses are afflicted with the drawback that they use rigid and hard elements which cause attrition of brittle particles. Besides, it is sometimes difficult if not impossible to introduce them into the enclosure because of their size.

In French Pat. No. 2,431,449 (equivalent to U.S. Pat. No. 4,306,829, the text of which is incorporated herein by reference), applicants have proposed an apparatus for the distribution of a divided solid in an enclosure, said apparatus comprising a loading hopper for the divided solid, a discharge chute integral with the hopper, a revolving member disposed below the outlet opening of the chute, and a motor for driving the revolving member in rotation, the revolving member comprising a shaft driven by the motor and disposed substantially along the axis of the discharge chute, and at least one flexible, moderately hard deflecting element carried by the shaft and articulated thereto so as to spread out therefrom at an angle by the effect of centrifugal force when driven in rotation.

Particularly well suited deflecting elements are pliant strips of a semirigid material, preferably articulated to the drive shaft at different levels, which may or may not all be of the same size, at the same level, or at different levels.

These strips, driven in rotation in the path of the particles leaving the discharge chute, radially deflect these particles without causing pronounced attrition since they are not very hard. Attrition is minimized further by the fact that these strips need not revolve at a very fast rate to provide good distribution of the catalyst in the reactor.

SUMMARY OF THE INVENTION

It is to this type of apparatus that the present invention relates. More particularly, it seeks to accelerate loading while maintaining the uniformity of the rainlike distribution of the solid particles over the entire cross-sectional area of the enclosure to be loaded even when the cross section of the enclosure is not circular or when the loading hopper is not located in the center of the cross-sectional area.

While the apparatus covered by the applicants' earlier patent permits the dense loading of enclosures of relatively limited capacity with a gain in density that may be greater than 22 percent over that obtained by the usual techniques, it has been observed that during loading a central cavity surrounded by a circular rim will form in the central part of the bed of particles when very large enclosures holding over 2,000 tons of material, for example, are loaded at very fast rates (from 5 to 250 tons per hour and up). At vey high loading rates, the bed thus does not build up evenly during loading, and because its top surface then is not level, distribution of the particles by the distributing device will not be satisfactory.

Moreover, in the loading of enclosures having a noncircular cross section, for example, silos with a square cross section, which are found in large numbers, and which may further be provided with but one loading opening that is often offset from the axis of symmetry of the silo, it is imperative to be able to specifically modify the distribution of the particles among the various zones of the enclosure with a view to obtaining the same rate of rainlike loading at all points in the cross-sectional area.

Up to now, none of the known loading methods has permitted the proper loading of this type of enclosure with a noncircular cross section and/or an off-center loading opening.

In pursuing the work on this type of apparatus, applicants have found that it is possible to meet all of these requirements simultaneously, while allowing the dense loading at a fast rate of very large enclosures, by providing the loading hopper and/or the discharge chute which is integral therewith with lateral discharge openings.

Thus, while a first loading occurs through the chute above the point where the flexible deflectors are articulated to the drive shaft or to a drive system coupled thereto, one or more further loadings are effected through the openings in the hopper and in the chute through which the solid particles are discharged sideways to fall on portions of the flexible deflectors which are remote from the drive shaft, thus enhancing the uniformity of the distribution in the enclosure at a considerable distance from the central axis.

Judicious choice of the opening or openings will thus permit the portions of the reactor which are off center relative to the axis of the loading hopper to be loaded selectively and in a dense and uniform manner.

The invention thus has as a preferred embodiment an apparatus for the loading of an enclosure with a particulate solid, said apparatus being of the type which comprises a loading hopper, a discharge chute which is integral with the hopper, and a movable member disposed below the outlet opening of the chute, the movable member comprising a shaft driven in rotation by a motor and several tiers of flexible, moderately hard deflecting elements which are articulated to the shaft or to a structure that is rigidly integral therewith, so as to spread out therefrom at an angle by the effect of centrifugal force when driven in rotation, said apparatus being characterized in that at least one discharge opening is provided in the side wall of the hopper and/or of the chute in the direction of the deflecting elements.

For the purpose of guiding the ejection of the particles through the opening or openings in the chute and/or in the hopper and of moving them away from the axis of the chute, flaps forming hoods are advantageously provided at the base of these openings on the outer surface of the hopper and/or of the chute. These flaps may, in particular, form a single circular hood around the chute.

It will be appreciated that by distributing these openings judiciously over the hopper and the chute and by optionally varying their sizes it becomes possible to preferentially direct the lateral distribution of solid particles through particular openings, thus enhancing the uniformity of the distribution of these particles by the deflecting elements.

On some industrial sites, for example, in refineries, it is convenient and often safer to use as means of rotation motors supplied with a compressed gas, which in most cases will be compressed air but which might also be nitrogen, an inert gas, carbon dioxide or any other commonly used gas or mixture of gases. It is then possible to take judicious advantage of the exhaust air from the motor by directing it by appropriate means toward the exterior of the chute so that it will aid in the ejection of the particles through the lateral openings.

This arrangement permits large-diameter enclosures to be loaded properly at a fast rate while minimizing possible attrition of the particles. In the case of enclosures with a large diameter, it may be necessary to rotate the deflecting elements at high speed in order that the desired effect of a uniform rain may cover the entire cross-sectional area of the enclosure to be filled. The flow of air exhausted by the aforesaid motor makes it possible to use a lower-power motor for an enclosure of a given diameter and to rotate the deflecting elements at a lower speed since they then are not subjected to the weight of the fraction of the particle stream which is being pushed by the exhaust air. This arrangement thus permits attrition of the particles to be minimized.

As described in said French Pat. No. 2,431,449, the deflecting elements may advantageously be formed of strips or ribbons of a semirigid material.

However, the applicants have found that strips of a generally rectangular form which revolve about the axis will provdie fully effective distribution of the particles only when the particles are fed in centrally. The spacing between two strips actually is proportional to their distance from the axis, and the spacing between the free ends of two adjacent strips thus is very much greater than the spacing between the strips at the ends where they are articulated to the shaft or to the structure which is integral therewith.

Therefore, when the particles are fed in through a side opening, one or more tiers of deflecting elements are preferably formed by strips or ribbons of such form that their width is sufficient to favor deflection of particles which fall at some distance from the central axis. These strips or ribbons, or at least those located in the first tier, may have a substantially trapezoidal form, for example, or will widen starting from a distance from the axis that will depend on the side opening referred to above.

BRIEF DESCRIPTION OF THE DRAWING

The practice of the invention is illustrated by the accompanying drawings, which are not limitative, and wherein.

DESCRIPTION OF THE PREFERRED EMBODIMENTS

Figure 1:
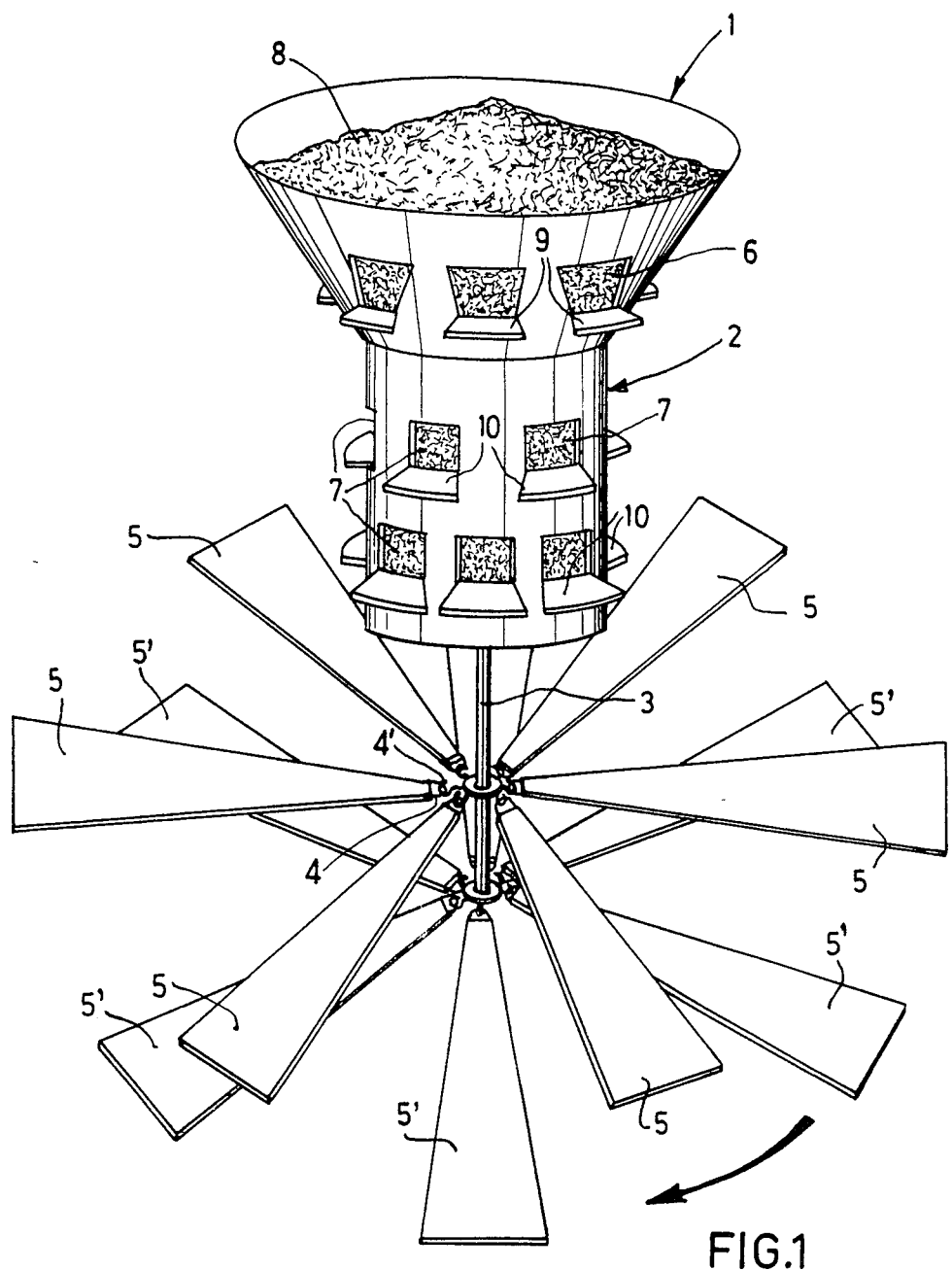
FIG. 1 is a perspective view of one embodiment of the distributing apparatus showing the flexible deflectors in the position of use.

FIG. 1 shows a frustoconical loading hopper 1 forming a funnel and provided at its base with a cylindrical discharge chute 2. The latter accommodates a small electric or compressed-air motor (not shown) which through a shaft 3 that is coaxial with the chute 2 drives at least two tiers of flexible deflecting elements 5 and 5' in the form of strips which at one end are articulated through rings 4 to hooks 4' carried by the shaft 3, as described in said French Pat. No. 2,431,449.

In accordance with the invention, the hopper 1 and the chute 2 are provided with side openings 6 and 7, respectively, designed to direct part of the charge 8 of solid particles contained in the hopper 1 toward the middle portions and the ends of the deflectors 5 and 5', from which they bounce off outwardly to load, in the form of a uniform and dense rain, all of the enclosure equipped with the apparatus.

The openings 6 and 7 may have any form and any position relative to the circumference of the hopper 1 and the chute 2 and may be adjustable with respect to form and throughput. They may be of any size, with the largest openings directed to the parts of the enclosure which it is desired to load preferentially, for example, the zones farthest removed from the axis of the apparatus. Advantageously, one or more side discharge openings may be oriented and distributed nonuniformly about the axis of the shaft for loading an enclosure having a noncircular cross section or an eccentric loading opening. An example of such nonuniform orientation and distribution of the side discharge openings is shown diagrammatically in FIG. 3.

With a view to directing the stream of solid particles and preventing them from dropping straight down as they leave the openings 6 and 7, a flap forming a hood 9 or 10, respectively, and extending outwardly is disposed at the base of these openings, in accordance with one embodiment of the present invention. These flaps may have any form and any inclination.

An apparatus of this type may have the following dimensions (in millimeters), for example:

Major diameter of hopper (1): 600
Height of hopper (1): 200
Diameter of chute (2): 340
Height of chute (2): 500
Number of openings (6): 9
Size of openings (6): 80×100
Number of openings (7): 16
Size of openings (7): 90×100
Number of deflectors (5): 10
Size of deflectors (5): 700×150×70

Such a distributing apparatus has been used to load a cylindrical rain silo 5 meters in diameter and 7 meters high at the rate of 40 tons/hour by driving the deflectors 5 at a speed of 120 rpm. The particle level rose evenly throughout the loading operation and remained substantially level without any pronounced nonuniformity. Under these conditions, the loading gain of the silo was 10 percent, based on the loading density obtained with the conventional loading system.

Thus, as pointed out above, it is possible, by varying the number, size and relative positions of the openings 6 and 7 in the hopper 1 and the chute 2, to preferentially distribute the solid particles through these openings toward specific zones of the enclosure to achieve dense and uniform loading of the latter, even if it lacks rotational symmetry.

Figure 2:
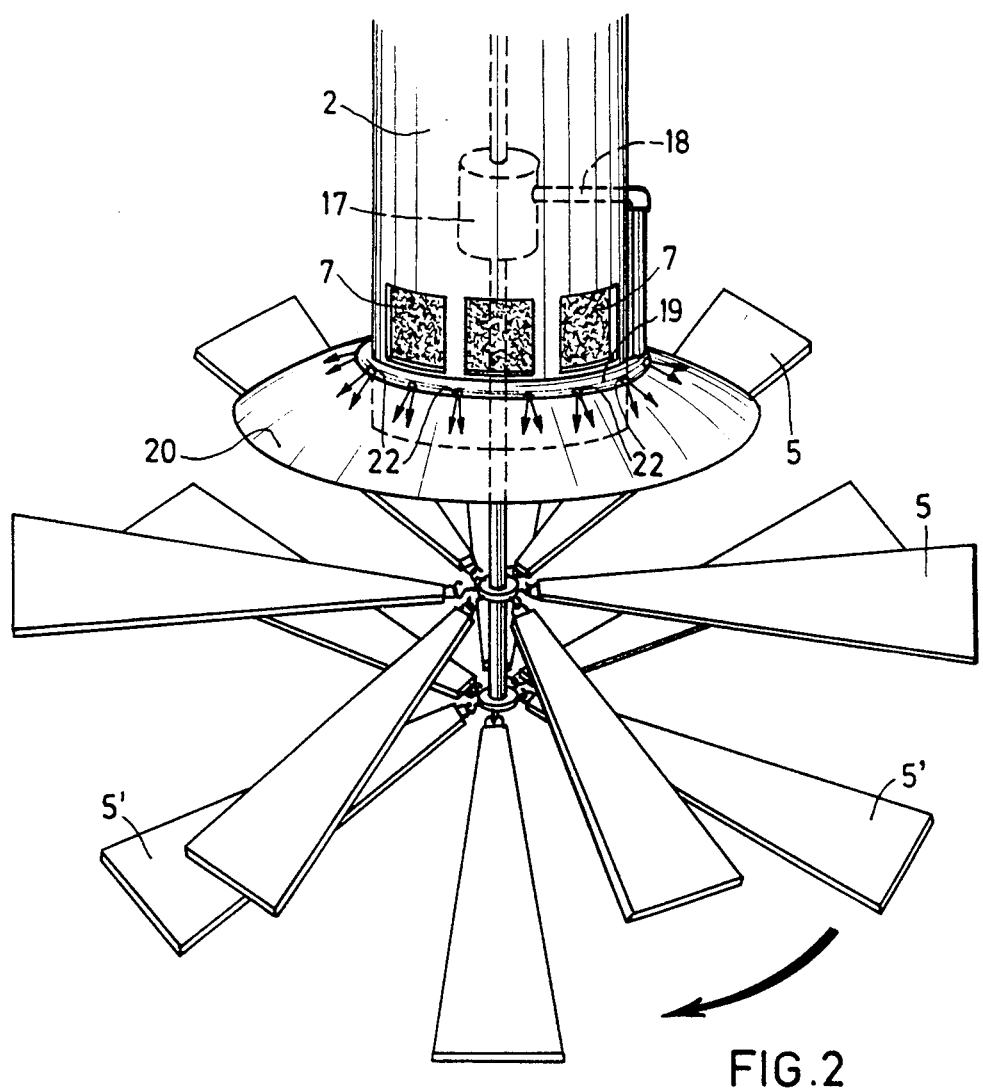
FIG. 2 is a perspective view of another embodiment of the same apparatus which uses as a booster the compressed air exhausted by the motor.

FIG. 2 shows an embodiment of the apparatus which uses a compressed-air motor 17 as a means of driving the flexible deflecting elements 5 and 5' in rotation. The apparatus only has one row of openings 7 disposed at the base of the chute 2, which is provided with a conical hood 20 serving the same purpose as the flaps 9 and 10 in FIG. 1. The air exhausted by the motor 17, or the gas which may take its place, is routed through a tube 18 to another, annular tube 19 disposed around the chute 2 at the level of the junction between the deflecting hood and the chute. This tube 19 is provided at its base with a row of small holes 22 which are directed so that the gas issuing from them has a direction parallel to the slope of the conical deflector. In place of the tube 19, a circular exhause nozzle for the compressed gas, or any other conventional means for the discharge of the gas, may be used.

The solid particles which stream out of the side openings thus slide along the hood 20 and, instead of falling with an initial velocity of practically zero, are ejected, at a velocity which depends on the inlet flow rae of the gas, at a distance from the axis of the enclosure because of the multiple jets of gas issuing from the small holes 20 in the tube 19.

Figure 3:
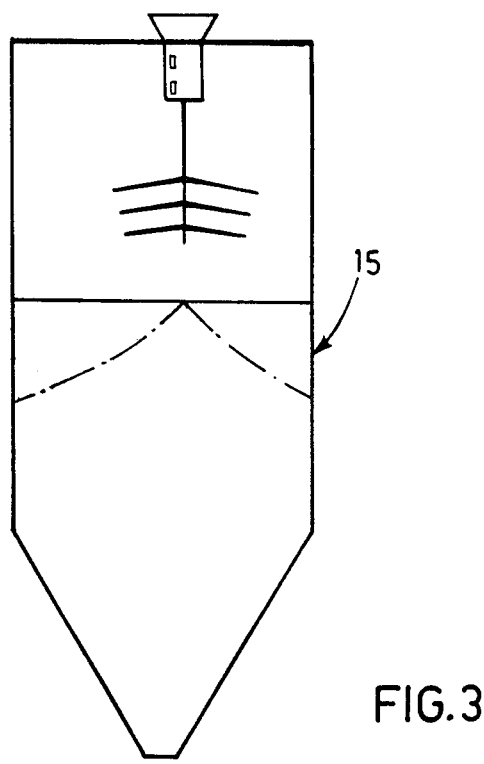
FIGS. 3 and 4 are diagrammatic representations of a silo, namely, a vertical section and a plan view, illustrating the application of this apparatus to the loading of a silo having a square cross section and comprising a single loading opening that is off center in realtion to the axis of symmetry.
Figure 4:
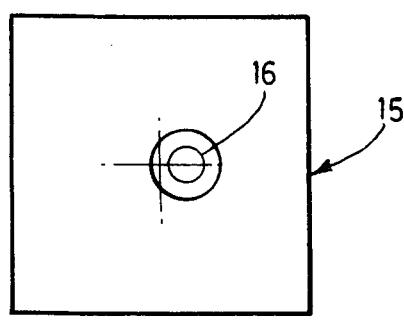

FIGS. 3 and 4 illustrate the application of the apparatus in accordance with the invention to the loading of such an enclosure, namely, a silo 15 of square cross section, measuring 4.6×4.6 meters, in whose top a single loading opening 16 that is offset from the axis of symmetry of the silo is provided.

Now while the use of a conventional loading system would result in the loading level shown in FIG. 3 in broken lines, that is to say, one that drops off laterally from a peak located directly under the opening 16, the apparatus of the invention permits uniform and even loading, with a substantially horizontal level, shown here by a solid line, with a loading gain of 10 percent at a loading rate of 20 tons/hour. There is no accumulation of material in the corners of the silo.

The apparatus of the invention therefore lends itself particularly well to dense loading, by rainlike distribution, of enclosures of large size (from 3 to 20 meters in diameter) or with a noncircular cross section, and also of enclosures provided with a single loading opening that is off center in relation to their axis of symmetry.

When the enclosure has radii of differing lengths with respect to the shaft axis positioned in the axis hole, the side discharge openings can be dimensioned and positioned to feed the deflecting means with supplemental amounts of solids at peripheral points such that the sections of the enclosure having greater radii generally receive proportionally greater amounts of solids, so all cross-sectional areas of the enclosure of a given size receive substantially equal amounts of solids.

It should be noted that the apparatus forms a compact unit and therefore lends itself readily to use with enclosures provided with a small loading opening.

The examples which follow will serve to illustrate the invention without limiting it in any way.

EXAMPLE 1

In this example, the apparatus of the invention is compared with that of French Pat. No. 2,431,449.

A cylindrical silo with a conical bottom of a diameter of 5 meters and a height of 7 meters was loaded with wheat at the rate of about 40 tons/hour by the use of an apparatus of the type described in said earlier French Pat. No. 2,431,449. The apparatus consisted in the main of a chute 340 mm in diameter and 500 mm high, provided at its base with an orifice 170 mm in diameter and comprising no side openings. Moreover, the revolving member was formed of 24 rectangular semirigid rubber strips of a width of 50 mm, distributed over three tiers, the first of which comprised eight strips 500 mm long while the two others comprised strips 1,000 mm long.

With the apparatus so described, the bed of wheat grains did not rise evenly during loading, and the final profile of its top surface has a cavity about 70 cm deep at its center, surrounded by a circular ridge sloping downward as far as the walls of the silo to a depth of about 1.6 meters. This poor profile indicates an unsatisfactory distribution of the grains and corresponds to a loading density that is less than maximum.

Applicants then ran another loading test on the same silo but with an apparatus of the type which is exemplified by the present invention, in other words, one having a hopper and a chute provided with side openings and with a revolving member formed of 24 rubber strips distributed over three tiers of eight strips. The lowermost tier consisted of rectangular strips measuring 50×500 mm, and the two other tiers were formed of trapezoidal strips, the bases of the trapezoid measuring 50 and 150 mm, and its height being 800 mm.

With this second apparatus, the bed of wheat grains rose evenly and remained substantially level during loading. This good distribution of the grains resulted in a loading density 10 percent greater than that obtained with bulk loading by the conventional system.

EXAMPLE 2

Another silo with a conical bottom but of square cross section, measuring about 4.6×4.6 meters and having a height of 12 meters, was loaded with barley.

When conventionally bulk-loaded, the top surface of the bed exhibited a cone making an angle of about 27 degrees with the horizontal, which corresponded to the natural angle of repose of the barley.

A second loading test was then run with an apparatus in accordance with the present invention of the type described in the second part of Example 1, except for the following differences:

Height of openings: 68 mm
Diameter of diaphragm: 100 mm
Three tiers of trapezoidal strips measuring 70×150×850 mm With this apparatus, and despite the square cross section of the silo, the bed of grains rose evenly during loading while remaining substantially level. Specifically, no accumulation of grains was observed in the corners of the silo.

The gain in loading density obtained was about 10 percent, based on the density secured with the conventional bulk-loading method.

EXAMPLE 3

In the chemical and petrochemical industry, catalytic reactors are encountered which are provided at their top with a manhole whose axis is offset from the axis of the reactor and through which the solid catalyst is introduced.

With such reactors, conventional loading by the use of a duct passing through the eccentric opening results in the formation of an unsymmetrical cone whose vertex is directly in the axis of the opening and whose angle is equal to the natural angle of repose of the catalyst introduced.

The use of an apparatus of the type described in French Pat. No. 2,431,449 and outlined in Example 1 (a chute lacking side openings; rectangular strips) in loading such reactors results in some improvement in that the cone is less marked and that a gain in loading density of a few percent, but less than 10 percent, is obtained.

Using an apparatus of the type to which the present invention relates, the applicants loaded a reactor 3.4 meters in diameter and about 4 meters high and provided with a manhole 500 mm in diameter whose axis was spaced 570 mm from the axis of the reactor.

The apparatus, centered on the axis of the manhole, consisted of a chute 240 mm in diameter and 500 mm high, provided at it base with an orifice 100 mm in diameter, and having five rectangular openings measuring 30×40 mm, all located in the side wall on one side relative to a diameter of the section.

The revolving member was formed of one tier of eight trapezoidal strips measuring 50×120×400 mm.

By judiciously orienting these openings so that the jets of catalyst issuing from the openings loaded, by way of the deflecting elements, the reactor zones farthest from the axis of the manhole, uniform distribution of the catalyst particles was obtained over the entire cross-sectional area of the reactor, with the cone observed in the cases mentioned above practically absent.

This good distribution resulted in a gain in loading density of between 10 and 15 percent, based on the loading density obtained with conventional loading by the use of a duct.

We claim:

1. An apparatus for loading an enclosure with particulate solids in the form of a dense bed, which comprises a loading hopper for the particulate solids, a discharge chute for the hopper having a discharge end, a motor means, a shaft driven by said motor means and extending substantially parallel to the axis of the discharge chute and out the discharge end thereof, flexible moderately hard deflecting means which are articulated at a first end to the shaft beyond the discharge end of said chute in a manner adapted to provide a second free end of the deflecting means opposite the first end such that the deflecting means diverge angularly from a downward position towards an outward position by the effect of centrifugal force when the shaft is rotated, and at least one side discharge opening in the side of the hopper or in the side of the chute such that particulate solids passing therethrough are directed towards the free ends of the centrifugally extended deflecting means.

2. An apparatus according to claim 1, whrein the deflecting means comprises a plurality of strips.

3. An apparatus according to claim 2, wherein the strips are articulated to the shaft in a plurality of tiers at different locations along the length of the shaft, and at least the strips of the uppermost tier are wider at their free ends than at their first ends.

4. An apparatus according to claim 2, wherein the strips widen from their first ends toward their free ends.

5. An apparatus according to claim 4, wherein the strips are substantially in the shape of isosceles trapezoids.

6. An apparatus according to claim 1 for loading an enclosure with particulate solids in the form of a dense bed at a fast rate, wherein said chute is circularly cylindrical, said shaft is concentric with said chute, and two or more of said side discharge openings are distributed uniformly about the axis of the shaft.

7. An apparatus according to claim 1 for loading an enclosure having a noncircular cross section or an eccentric loading opening, wherein one or more side discharge openings are oriented and distributed nonuniformly about the axis of the shaft.

8. An apparatus according to claim 1, further comprising at least one flap projecting outwardly from the hopper, from the chute or from each of the hopper and the chute immediately below a respective side discharge opening.

9. An apparatus according to claim 8, wherein two or more flaps are interconnected to form a single circular hood about the chute.

10. An apparatus according to claim 8, further comprising means for ejecting a compressed gas outwardly from adjacent the junction between the flap and its respective side discharge opening so as to aid in accelerating particulate solids through said opening towards said deflecting means.

11. An apparatus according to claim 9, further comprising means for ejecting a compressed gas outwardly from around the chute at the upper level of the junction between the circular hood and the chute.

12. An apparatus according to claim 11, wherein the compressed gas is ejected through a circular tube which is disposed annularly about the chute and which has at least one hole.

13. An apparatus according to claim 10, wherein the compressed gas is selected from the group consisting of air, nitrogen, an inert gas, carbon dioxide, and a mixture thereof.

14. An apparatus according to claim 11, wherein the compressed gas is selected from the group consisting of air, nitrogen, an inert gas, carbon dioxide and a mixture thereof.

15. An apparatus according to claim 11, wherein the compressed gas comes from the motor means.

16. An apparatus according to claim 14, wherein the compressed gas comes from the motor means.

17. A method of charging an enclosure with particulate solids in the form of a dense bed, which comprises positioning an apparatus having a loading hopper for the particulate solids, a discharge chute for the hopper having a discharge end, a motor means, a shaft driven by said motor means and extending substantially parallel to the axis of the discharge chute and out the discharge end thereof, flexible moderately hard deflecting means which are articulated at a first end to the shaft beyond the discharge end of said chute in a manner adapted to provide a second free end of the deflecting means opposite the first end such that the deflecting means diverge angularly from a downward position towards an outward position by the effect of centrifugal force when the shaft is rotated, and at least one side discharge opening in the side of the hopper or in the side of the chute such that particulate solids passing therethrough are directed towards the free ends of the centrifugally extending deflecting means with said deflecting means extending down into said enclosure through an access hole, rotating said shaft by said motor means, and feeding said particulate solids through said hopper to said deflecting means to charge said enclosure.

18. A method according to claim 17, wherein the feeding step is carried out at a rate of from 5 to 250 tons/hour.

19. Method of charging with particulate solids in the form of a dense bed an enclosure having a non-circular cross section or an off-center access hole, which comprises positioning an apparatus having a loading hopper for the particulate solids, a discharge chute for the hopper having a discharge end, a motor means, a shaft driven by said motor means and extending substantially parallel to the axis of the discharge chute and out the discharge end thereof, flexible moderately hard deflecting means which are articulated at a first end to the shaft beyond the discharge end of said chute in a manner adapted to provide a second free end of the deflecting means opposite the first end such that the deflecting means diverge angularly from a downward position towards an outward position by the effect of centrifugal force when the shaft is rotated, and at least one side discharge opening in the side of the hopper or in the side of the chute wherein one or more side discharge openings are oriented and distributed nonuniformly about the axis of the shaft such that particulate solids passing therethrough are directed towards the free ends of the centrifugally extended deflecting means with said deflecting means extending down into said enclosure through said access hole, rotating said shaft by said motor means, and feeding said particulate solids through said hopper to said deflecting means to charge said enclosure.

20. Method according to claim 18, wherein the enclosure has radii of differing lengths with respect to the shaft axis when positioned in said access hole, said side discharge openings are dimensioned and positioned to feed said deflecting means with supplemental amounts of said solids at peripheral points such that the sections of the enclosure having greater radii generally receive proportionally greater amounts of said solids, so all cross-sectional areas of the enclosure of a given size receive substantially equal amounts of solids.

* * * * *

UNITED STATES PATENT AND TRADEMARK OFFICE
CERTIFICATE OF CORRECTION

PATENT NO. : 4,564,328

DATED : Jan. 14, 1986

INVENTOR(S) : Roben Loutaty; Yvon Haquet

It is certified that error appears in the above-identified patent and that said Letters Patent is hereby corrected as shown below:

Column 10, line 23 (claim 20, line 1) delete "18" and insert --19--.

Signed and Sealed this

First Day of April 1986

[SEAL]

Attest:

DONALD J. QUIGG

Attesting Officer

Commissioner of Patents and Trademarks